(12) United States Patent
Canard et al.

(10) Patent No.: US 7,657,738 B2
(45) Date of Patent: Feb. 2, 2010

(54) LIST SIGNATURE METHOD AND APPLICATION TO ELECTRONIC VOTING

(75) Inventors: Sébastien Canard, Caen (FR); Marc Girault, Caen (FR); Jacques Traore, Saint Georges des Groseillers (FR)

(73) Assignee: France Telecom, Paris (FR)

( * ) Notice: Subject to any disclaimer, the term of this patent is extended or adjusted under 35 U.S.C. 154(b) by 858 days.

(21) Appl. No.: 10/521,833

(22) PCT Filed: Jul. 16, 2003

(86) PCT No.: PCT/FR03/02251

§ 371 (c)(1),
(2), (4) Date: Aug. 1, 2005

(87) PCT Pub. No.: WO2004/010642

PCT Pub. Date: Jan. 29, 2004

(65) Prior Publication Data

US 2006/0015737 A1    Jan. 19, 2006

(30) Foreign Application Priority Data

Jul. 19, 2002 (FR) .................................. 09218/02

(51) Int. Cl.
*H04L 9/32* (2006.01)
(52) U.S. Cl. ........................... 713/156; 380/286; 705/74
(58) Field of Classification Search ................. 380/286; 705/74

See application file for complete search history.

(56) References Cited

U.S. PATENT DOCUMENTS

| | | | | |
|---|---|---|---|---|
| 6,154,841 A * | 11/2000 | Oishi | ......................... | 713/180 |
| 6,298,153 B1 * | 10/2001 | Oishi | ......................... | 382/186 |
| 7,028,180 B1 * | 4/2006 | Aull et al. | .................... | 713/156 |
| 2002/0077887 A1 * | 6/2002 | Shrader et al. | ................ | 705/12 |
| 2002/0138341 A1 * | 9/2002 | Rodriguez et al. | ............ | 705/12 |
| 2003/0066872 A1 * | 4/2003 | McClure et al. | ............... | 235/51 |
| 2003/0190046 A1 * | 10/2003 | Kamerman et al. | ......... | 380/286 |
| 2008/0313465 A1 * | 12/2008 | Gentry | ....................... | 713/176 |

\* cited by examiner

*Primary Examiner*—Matthew B Smithers
(74) *Attorney, Agent, or Firm*—Daphne L. Burton; Burton IP Law Group

(57) ABSTRACT

The invention concerns a list signature method comprising: an organization phase whereby reliable authority defines parameters for implementing an anonymous electronic signature; a phase which consists in registering persons on a list of authorized members to generate a list signature, during which each person calculates a private key, and the reliable authority delivers to each person a certificate for membership of the list; a phase which consists in defining a serial number; a phase wherein a member of the list generates by means of certificate a signature containing an element common to all the signatures issued by one single member with one single serial number; a phase which consists in verifying whether the signature has been generated by a member of the list and whether the serial number has been used to generate the signature.

15 Claims, 4 Drawing Sheets

LIST SIGNATURE METHOD AND APPLICATION TO ELECTRONIC VOTING

CROSS-REFERENCE TO RELATED APPLICATIONS

This application claims priority to French patent application No. 0209218 filed on or about Jul. 19, 2002. A related application was also filed under the Patent Cooperation Treaty on or about Jul. 16, 2003, as PCT/FR03/02251. The PCT application claims priority to the French patent application.

BACKGROUND OF THE INVENTION

1. Field of the Invention

The present invention relates to the general field of security of services accessible through a digital data transmission network, and more specifically to the field of electronic signature.

It notably, but not exclusively, applies to electronic voting or even to electronic petition.

2. Description of the Related Art

The electronic signature of a message implements a mechanism pertaining to so-called asymmetric cryptography: the signatory, who has a secrete or private key and an associated public key, may produce a message signature by means of the secrete key. To verify the signature, it is sufficient to have the public key.

In certain applications like electronic voting, the signatory should be able to remain anonymous. For this purpose, the so-called anonymous electronic signature has been developed enabling with the help of a public key to determine whether the signatory of a message has certain rights (rights to sign the message, rights to have the secrete key used for signing the message, etc.) while preserving the anonymity of the signatory. In addition, in voting or electronic petition applications, each authorized person should be able to sign only once.

Among anonymous signatures, there is also what is called the blind signature allowing a person to obtain a signature of a message from another entity, without the latter having to know the contents of the message, and being able to establish later the link between the signature and the identity of the signatory. This blind signature solution therefore requires the intervention of an intermediate entity who produces the signatures. In applications such as voting and electronic petition, each solution involves an empowered authority who signs the vote of each voter or the petition for each petitioner.

The concept of a group signature has also been proposed which enables each member of a group to produce a signature so that a verifier having an adequate public key may verify whether the signature was issued by a member of the group without being able to determine the identity of the signatory.

This concept is described for example in document:

[1] "A Practical and Provably Secure Coalition-Resistant Group Signature Scheme", of G. Ateniese, J. Camenisch, M. Joye and G. Tsudik, in M. Bellare, Editor, Advance in Cryptology—CRYPTO 2000, vol. 1880 of LNCS, pp. 255-270, Springer-Verlag 2000.

However, in this concept, a reliable authority may at any moment break this anonymity and determine the identity of a person of the group having issued a signature. In addition, this type of signature is said to be "non linkable", i.e. it does not allow one to determine whether two signatures were or not issued by the same person, without breaking the anonymity of the signature. Group signatures are used in many applications, such as electronic auctions, electronic cash, or even electronic voting. Group signature is utterly unsuitable for the latter application as it authorizes a reliable authority to access the identity of a signatory, and it does not allow the linking of two signatures issued by a same person without determining the identity of the signatory. In addition, document [1] does not provide any process for revoking a member of the group.

To remedy the latter drawback, document [2] "Efficient Revocation of Anonymous Group membership Certificates and Anonymous Credentials" of J. Camenisch and A. Lysysanskaya, published by Cryptologie ePrint Archive IACR, 2002, provides the adding of a revocation process to this concept (this document will also be published by M. Jung, Editor CRYPTO 2002, Springer-Verlag 2002). However, this solution does not provide a solution to the problems of preserving the anonymity of the signatory, and "linkability" of two signatures.

In an electronic voting application, it is further necessary to ensure security approaching traditional voting at the very most, in order to guarantee the following properties.

Nobody should be capable of knowing the results of the poll even partially before its closing. Everybody should be able to be persuaded of the validity of the final result of the poll. Finally, an empowered authority should be able to withdraw or revoke the voting right of a person.

Whether one is dealing with off-line voting, i.e. with the use of an electronic voting machine, set up in a polling station or in on-line-voting, i.e., remotely, via the Internet network for example, the presently proposed systems, using a group signature as described in document [1] and completed in document [2], do not meet these conditions, except for revoking the right of signature.

Moreover, application of the blind signature concept to electronic voting is a solution for which implementation is awkward, as the voter is compelled to logon several times at each election. In addition, if the poll backfires, the person responsible for this cannot be determined: either a voter or the organizer of the poll.

The concept of mixer networks has also been proposed, notably in document [3] "Untraceable Electronic Mail Return Addresses and Digital Pseudonym" of D. Chaum, ACM 1981, each mixer being a function producing a list of numbers decrypted from a list of encrypted numbers, while concealing the match between the encrypted and decrypted numbers. Applied to electronic voting, this technique has the major drawback of not allowing the validity of a vote to be verified without compromising the secret thereof.

In document [4] "A secure and Optimal Efficient Multi-Authority Election Scheme", of Cramer, Gennaro, and Schoenmakers, Eurocrypt'97, LNCS—Springer-Verlag, so-called homomorphic encryption is described enabling basic calculations to be performed on encrypted numbers. Solutions based on this method however are not applicable to polls involving a large number of voters.

SUMMARY OF THE INVENTION

The object of the present invention is to get rid of this drawback. This goal is achieved by providing a list signature method comprising at least:

an organizing phase consisting, for a reliable authority, of defining parameters for implementing an anonymous electronic signature, including a private key and a corresponding public key, a phase of registering persons in a list of members authorized to generate an electronic signature specific to the members of the list, during which each person to be recorded calculates a private key with the help of the parameters provided by the reliable authority and of parameters randomly selected by the person to be registered, and the reliable authority delivers a list membership certificate to each person to be registered, a signing phase during which a member of the list generates and issues a signature specific to the members of the list, this signature being built in order to contain proof that the member of the list having issued the signature, has a list membership certificate, and a phase of verifying the issued signature comprising steps for applying a predefined algorithm in order to show the proof that the signature was issued by a person having a list membership certificate.

According to the invention, this method further comprises:

a phase of defining a series consisting, for a reliable authority, of generating a serial number to be used in the signature phase, a signature generated during the signature phase comprising a signature element which is common to all the signatures issued by a same member of the list with a same serial number and which contains proof that the serial number was used for generating the signature, the verifying phase further comprising a step of verifying the proof that the serial number was used for generating the signature;

a phase of revoking a member of the list in order to remove a member from the list, during which the reliable authority removes the member to be removed from the list and updates the parameters for implementing the anonymous electronic signature, in order to take into account the removal of the member from the list; and a phase of updating the certificates of the members of the list in order to take into account changes in the composition of the list.

According to one embodiment of the invention, the organizing phase comprises definition of a common parameter depending on the composition of the list, the phase of registering a person in the list, comprising the definition of a parameter specific to the person to be registered which is calculated according to the parameter depending on the composition of the list, and which is integrated into the certificate handed out to the person, the registering phase comprising a step of updating the common parameter depending on the composition of the list, a phase of revoking a member of the list comprising a step of changing the common parameter depending on the composition of the list, in order to take into account the removal of the member from the list, and the phase of updating certificates of the members of the list including a step of updating the parameter specific to each member of the list in order to take into account changes in the composition of the list.

According to an embodiment of the invention, a signature specific to a member of the list and having the certificate $[A_i, e_j]$ comprises parameters $T_1, T_2, T_3$, such that:

$$T_1 = A_i b^\omega (\mod n),$$

$$T_2 = g^\omega (\mod n),$$

$$T_3 = g e_j h^\omega (\mod n),$$

where $\omega$ is a randomly selected number during the signature phase, and b, g, h, and n are general parameters for implementing the group signature, such that parameters b, g and h cannot be inferred from each other by integer power raising modulo n functions, so that the number $A_i$ and therefore the identity of the member of the list having the certificate $[A_i, e_j]$ cannot be inferred from a signature issued by the member.

Preferably, the number of a series used for generating a list signature is calculated according to a beginning date of the series.

Advantageously, the function for calculating the number of a series is in the form:

$$F(d) = (H(d))^2 (\mod n)$$

where H is a collision-resistant hash function, d is the beginning date of the series, and n is a general parameter for implementing the group signature.

According to an embodiment of the invention, the parameter $T_4$ of a signature issued by a member of the list and depending on the serial number m and on the private key $x_i$ of the signatory member is obtained from the following formula:

$$T_4 = m^{x_i} (\mod n)$$

n being a general parameter for implementing the group signature and the signature comprising the proof that the parameter $T_4$ was calculated with the private key $x_i$ of the member of the list who issued the signature.

The invention also relates to an electronic voting method comprising a phase for organizing the elections, during which an organizing authority proceeds with generating parameters required for a poll, and assigns keys to the scrutineers, allowing them to decrypt and verify ballots, a phase of assigning a signature right to each of the voters, a voting phase during which the voters sign a ballot, and a counting phase during which the scrutineers verify the ballots and calculate the result of the poll according to the contents of the decrypted and valid ballots.

According to the invention, this method implements a list signature method as defined hereinbefore, for signing ballots, each voter being registered as a member of a list, and a serial number being generated for the poll, in order to detect whether a same voter has issued several ballots for the poll or not.

According to one embodiment of the invention, the organizing phase comprises the handing out of a public key and a private key to each scrutineer, the ballots being encrypted with a public key obtained by the product of the respective public keys of all the scrutineers, and the corresponding decryption private key being obtained by calculating the sum of the respective private keys of all the scrutineers.

Advantageously, encryption of the ballots is carried out with a probabilistic encryption algorithm.

According to one embodiment of the invention, the ballots issued by the voters are stored in a public database, the result of the verifying and counting of each ballot being stored in the database associated with the ballot, and the private key for decrypting the ballots being published.

BRIEF DESCRIPTION OF THE DRAWINGS

A preferred embodiment of the invention will be described hereafter, as a non-limiting example, with reference to the appended drawings wherein.

DETAILED DESCRIPTION OF THE INVENTION

The present invention proposes a list signature method wherein all the authorized persons, i.e. belonging to the list, may produce a signature which is anonymous, and anybody is able to verify the validity of the signature without having access to the identity of the member of the list who signed.

Figure 1:
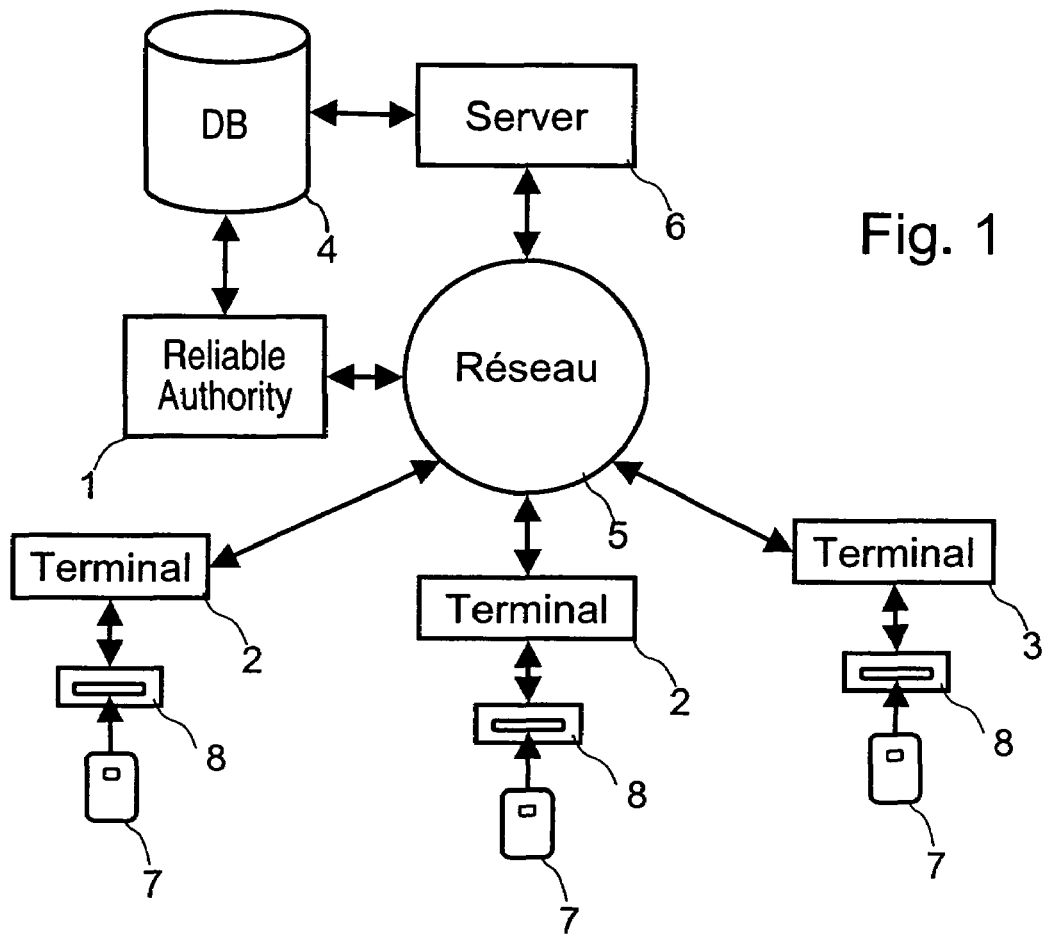
FIG. 1 illustrates a system for implementing the list signature and electronic voting methods according to the invention.

Such a method may be implemented in the system illustrated in FIG. 1. This system comprises terminals 2 made available to the users and connected to a digital data transmission network 5 such as the Internet network. Advantageously, each terminal 2 is connected to a chip card 7 reader 8. Via the network 5, users may log on to a server 6 giving access to information for example stored in a database 4. This system also comprises a computer 1 of a reliable authority who notably delivers chip cards 7 to the users.

The list signature method according to the invention repeats in the group signature method described in the referenced document [1], the following procedure:

a procedure for organizing a group of signatories, which consists of setting up various parameters and required public keys, a registration procedure wherein a person to be registered in the group receives from a reliable authority a right of signature, i.e. an authorized private key and certificate, an actual signing procedure during which a person having a signature right signs a message, and a verifying procedure consisting of applying a verification algorithm to a signature in order to verify whether the signature was produced by a person having a signature right.

The invention further provides an arrangement for guaranteeing the anonymity of a signatory, even with respect to a reliable authority, as well as a series organizing procedure consisting of defining a serial number to be used for generating list signatures, the verification of a signature further comprising a step of verifying whether the signature is unique for a given serial number.

The method according to the invention may also include a revocation procedure as defined in referenced document [2]. With this revocation procedure, a reliable authority may remove from a member of the list, the signature rights which were assigned to him/her earlier, from the identity of the member. The setting up of this revocation possibility involves execution by the members of the list of an updating procedure during which the members of the list update their certificates in order to take into account the changes (addition or removals) made in the list of the persons authorized to sign.

Figure 2:
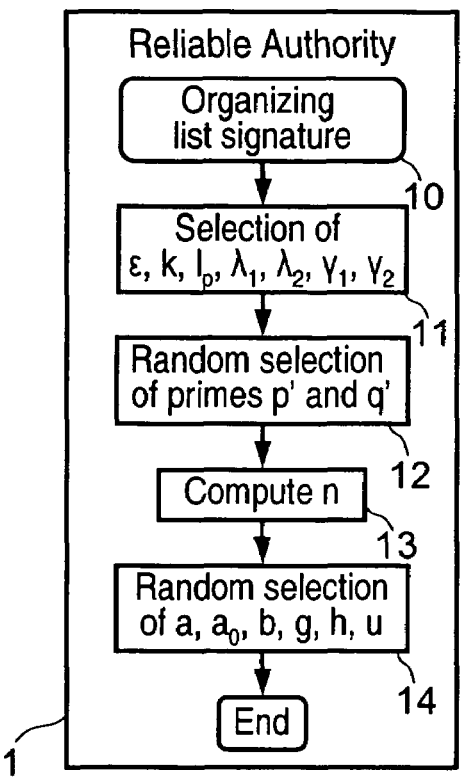
FIGS. 2-8 illustrate as flow diagrams, the various procedures which are executed in accordance with the list signature and electronic voting method according to the invention.

FIG. 2 illustrates the different steps of the organizing procedure 10 executed on the computer 1 of the reliable authority.

According to the referenced document [1], this procedure consists of selecting 11 the following integers:

$\epsilon > 1, k, l_p$, $\lambda_1, \lambda_2, \gamma_1, \gamma_2$, which are the lengths of the integers in numbers of bits, with:

$$\lambda_2 > 4l_p \tag{1}$$

$$\lambda_1 > \epsilon(\lambda_2 + k) + 2 \tag{2}$$

$$\gamma_2 > \lambda_1 + 2 \tag{3}$$

$$\gamma_1 > \epsilon(\gamma_2 + k) + 2 \tag{4}$$

and of defining the sets of following integers:

$\Lambda = ]2^{\lambda_1} - 2^{\lambda_2}, 2^{\lambda_1} + 2^{\lambda_2}]$, and $\Gamma = ]2^{\gamma_1} - 2^{\gamma_2}, 2^{\gamma_1} + 2^{\gamma_2}]$.

This procedure also consists of selecting a collision-resistant hash function H such that a binary sequence of any length marked as $\{0, 1\}^*$ is transformed into a binary sequence of length k marked as $\{0, 1\}^k$.

Next, the computer 1 of the reliable authority randomly generates in step 12, prime numbers p' and q' with size $l_p$, such that p=2p'+1 and q=2q'+1 and q=2q'+1, are also prime numbers. Next, it computes in step 13 module n=pq and randomly generates in step 14, integers a, $a_0$, b, g and h, in the set QR(n) of quadratic residues of n, i.e. the set of integers y such that $y=x^2 \pmod{n}$, x being an integer. It is then considered that the public key PK of the reliable authority consists of the series of integers (n, a, $a_0$, b, g, h) and that the private key of the latter consists of the series of integers (p', q').

Figure 3:
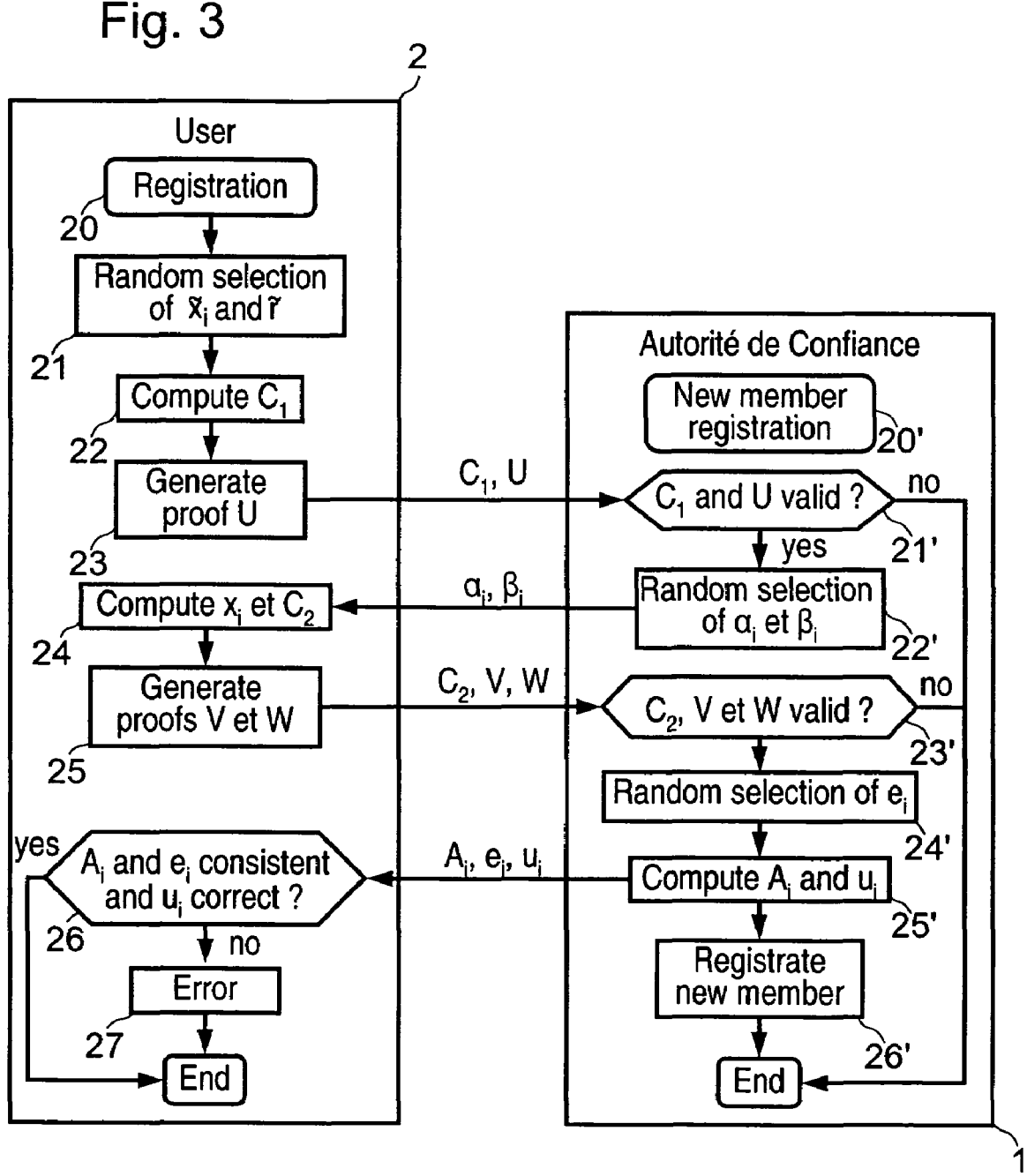

In order to be registered by the reliable authority, a user wishing to become a member of the list executes the procedure 20 illustrated in FIG. 3, on his/her terminal 2. Execution of this procedure engages a dialog with the computer 1 of the reliable authority which then executes a procedure 20'. Procedure 20 first of all comprises a step 21 for randomly generating integers $\tilde{x}_i$ et $\tilde{r}$, respectively intervals $]0, 2^{\lambda_2}]$ and $]0, n^2[$. From these integers, an integer $C_1$ is calculated 22 such that:

$$C_1 = g^{\tilde{x}_i} h^{\tilde{r}} \pmod{n} \tag{5}$$

In step 23, the proof of the knowledge of both numbers $\alpha$ and $\beta$ (i.e. $\tilde{x}_i$ et $\tilde{r}$) is built such that $C_1 = g^\alpha h^\beta \pmod{n}$.

Such a proof is formed for example by randomly selecting two integers $r_1$ and $r_2$ in the set of signed binary numbers with $\epsilon(2l_p+k)$ bits, marked as $\pm\{0, 1\}^{\epsilon(2l_p+k)}$, and by calculating the following numbers:

$$d_1 = g^{r_1} h^{r_2} \pmod{n}, \tag{6}$$

$$c = H(g\|h\|C_1\|d_1), \tag{7}$$

wherein the $\|$ symbol represents the concatenation operator, $$s_1 = r_1 - c\alpha, \tag{8}$$

$$s_2 = r_2 - c\beta. \tag{9}$$

$s_1$ and $s_2$ being relative integers.

The proof U is then equal to $(c, s_1, s_2, C_1)$.

The number $C_1$ and the proof U are then sent to the reliable authority who in step 21', verifies proof U and whether $C_1$ is in the QR(n) set of quadratic residues of n.

In the previous example, verification of the proof consists of calculating:

$$t_1 = C_1^c g^{s_1} h^{s_2} \pmod{n}, \text{ and} \tag{10}$$

$$c' = H(g\|h\|C_1\|t_1). \tag{11}$$

The proof is established if c'=c and if $s_1$ and $s_2$ belong to the set $\pm\{0, 1\}^{\epsilon(2l_p+k)+1}$.

If such is the case, the computer 1 of the reliable authority, randomly generates in step in 22' two integers $\alpha_i$, $\beta_i$ in the interval $]0, 2^{\lambda_2}[$, and sends these numbers to the terminal 2 of the user. In procedure 20, the terminal of the user then calculates in step 24 the integers $x_i$ and $C_2$ by applying the following formulae:

$$x_i = 2^{\lambda_1} + (\alpha_i \tilde{x}_i + \beta_i \pmod{2^{\lambda_2}}), \text{ and} \tag{12}$$

$$C_2 = a^{x_i} \pmod{n}. \tag{13}$$

Next, the following proofs are built in step 25 (for example according to the same principle as proof U):

the proof V of having a number α belonging to set Λ such that:

$$C_2 = a^\alpha \pmod{n} \tag{14}$$

the proof W of having three numbers β, γ, δ, such that β ∈ ]$-2^{\lambda_2}, 2^{\lambda_2}$[, and $$C_2/a^{\lambda_2} = a^\beta, \text{ and} \tag{15}$$

$$C_1^{\alpha_i} g^{\beta_i} = g^\beta (g^{2^{\lambda_2}})^\gamma h^\delta \tag{16}$$

$C_2$ and proofs V and W are then sent to the computer 1 of the reliable authority who verifies 23' the proofs V and W and whether $C_2$ belongs to set QR(n). If such is the case, it randomly generates 24' a prime number $e_i$, belonging to set Γ and applies the following formula:

$$A_i = (C_2 a_0)^{1/e_i} \pmod{n} \tag{17}$$

and sends back to the user, integers $A_i$ and $e_i$, considered as a certificate $[A_i, e_j]$ for the user's membership of the list.

Computer 1 then generates 26' a new entry in a table of members of the list, for example in the database 4, in which is stored the certificate $[A_i, e_j]$ for changes in the list (for example revocations of members), and preferably for messages exchanged between the reliable authority and the user, during this procedure for registering the user.

Moreover, the user may verify 26 the authenticity of the received certificate by verifying that the following equation is satisfied:

$$a^{x_i} a_0 = A_i^{e_i} \pmod{n} \tag{18}$$

At the end of this registration procedure 20, the user therefore has a private key $x_i$ and a certificate $[A_i, e_i]$ of membership of the list, which for example are stored in a chip card 7.

With such a certificate, the user may generate a signature of a message M belonging to set $\{0, 1\}^*$.

For this purpose, the reliable authority publishes according to the invention, a serial number m, randomly selected in set QR(n). This number will have to be used by the members of the list for signing a message during a given series. The respective numbers of different series must not be linkable. In particular, it should be impossible to calculate a discrete logarithm of a given serial number, relatively to the base of another serial number, i.e. it should not be possible to practically calculate integers x and y, such as:

$m^x = m'^y \pmod n$, m and m' being serial numbers.

This serial number m may be calculated according to the date of the beginning of the series: m=F(date). For example this function F is chosen to be equal to:

$$F(d) = (H'(d))^2 \pmod{n} \tag{19}$$

where H', a collision-resistant hash function, such as a binary sequence of any length marked as $\{0, 1\}^*$, is transformed into a binary sequence with length $21_p$ marked as $\{0, 1\}^{21_p}$. It is therefore easy to verify the validity of the serial number by applying formula (19).

The procedure for signing a message is designed so that a user may show that he/she has a member certificate and a member private key and that he/she uses the proper serial number.

Figure 4:
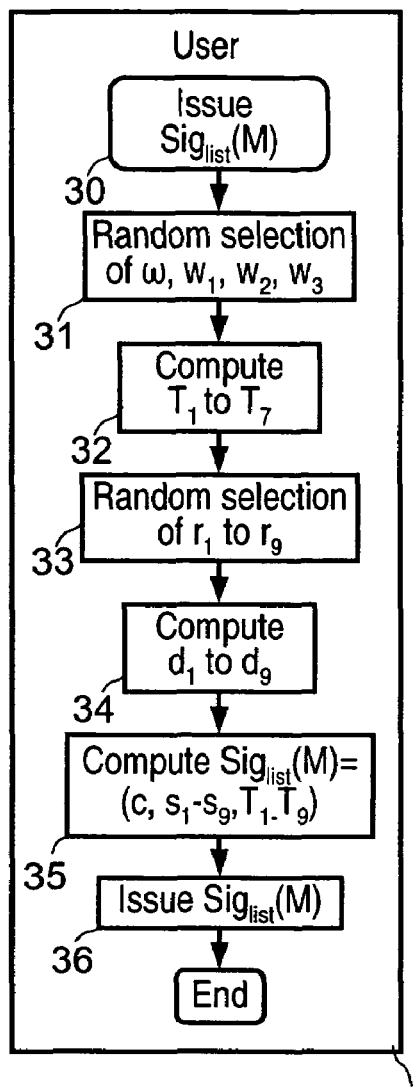

To sign a message M, a member of the list must execute, for example on his/her chip card 7, connected to a terminal 2 and storing his/her certificate $[A_i, e_i]$ and his/her private key $x_i$, a signature procedure 30 illustrated in FIG. 4. This procedure first of all comprises a step 31 for randomly generating a number ω belonging to the set $\{0, 1\}^{21_p}$.

It further comprises a step 32 consisting of calculating the following numbers from ω:

$$T_1 = A_i b^\omega \pmod{n}, \tag{20}$$

$$T_2 = g^\omega \pmod{n}, \tag{21}$$

$$T_3 = g^{e_i} h^\omega \pmod{n}. \tag{22}$$

According to the invention, the following number is also calculated:

$$T_4 = m^{x_i} \pmod{n} \tag{23}$$

In the next step 33, numbers $r_1$ in the set of signed binary numbers with $\epsilon(\gamma_2+k)$ bits, marked as $\pm\{0, 1\}^{\epsilon(\gamma_2+k)}$, $r_2$ in the set $\pm\{0, 1\}^{\epsilon(\lambda_2+k)}$, $r_3$ in the set $\pm\{0, 1\}^{\epsilon(\gamma_1+2 1_p+k+1)}$, and $r_4$ in the set $\pm\{0, 1\}^{\epsilon(2 1_p+k)}$ are randomly generated. Then in step 34, the following quantities are calculated:

$$d_1 = T_1^{r_1}/(a^{r_2} y^{r_3}) \pmod{n} \tag{24}$$

$$d_2 = T_2^{r_1}/g^{r_3} \pmod{n} \tag{25}$$

$$d_3 = g^{r_4} \pmod{n} \tag{26}$$

$$d_4 = g^{r_1} h^{r_4} \pmod{n} \tag{27}$$

According to the invention the following number is also calculated:

$$d_5 = m^{r_2} \pmod{n} \tag{28}$$

Then, in step 35 the following numbers are calculated:

$$c = H(m\|b\|g\|h\|a_0\|a\|T_1\|T_2\|T_3\|T_4\|d_1\|d_2\|d_3\|d_4\|d_5\|M), \tag{29}$$

wherein || represents the concatenation operation, $$s_1 = r_1 - c(e_i - 2^{\gamma_1}), \tag{30}$$

$$s_2 = r_2 - c(x_i - 2^{\lambda_1}), \tag{31}$$

$$s_3 = r_3 - c e_i \omega, \tag{32}$$

$$s_4 = r_2 - c\omega, \tag{33}$$

$s_1, s_2, s_3, s_4$ being relative integers.

The signature finally consists of the set of following numbers:

$$(c, s_1, s_2, s_3, s_4, T_1, T_2, T_3, T_4) \tag{34}$$

which for example is issued by the network 5.

Figure 5:
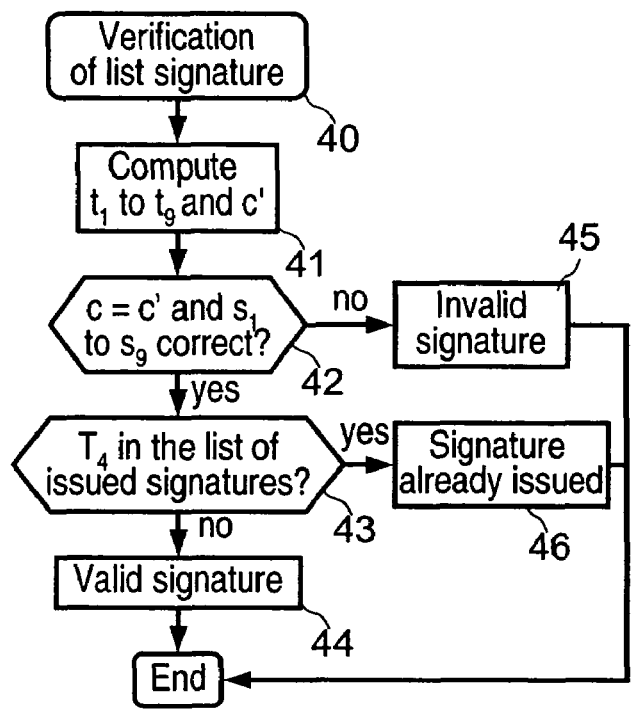
Figure 6:
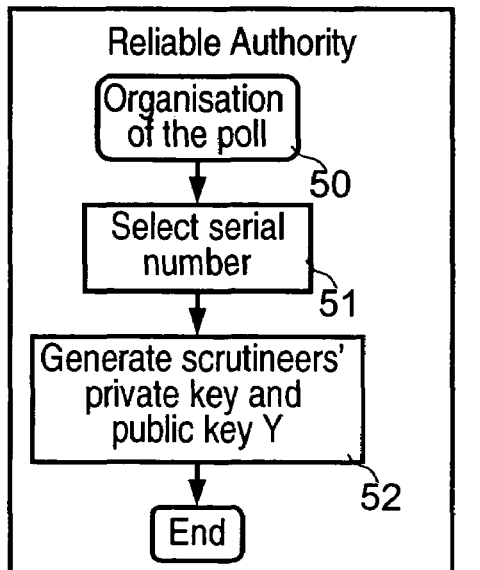
Figure 7:
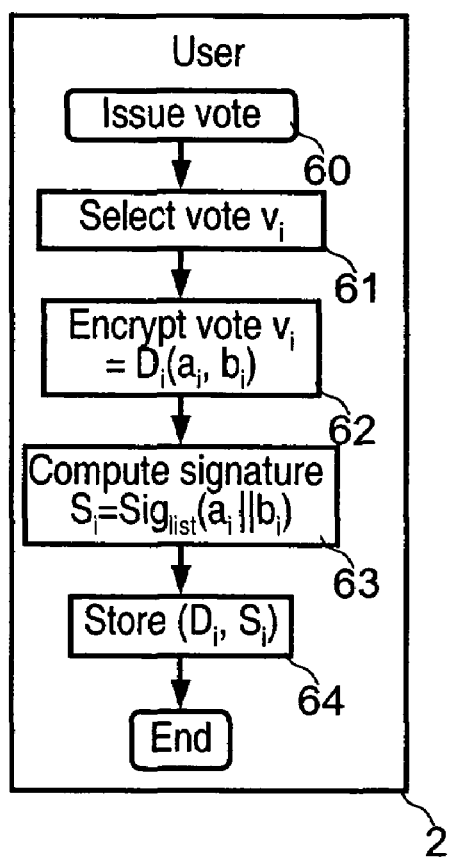
Figure 8:
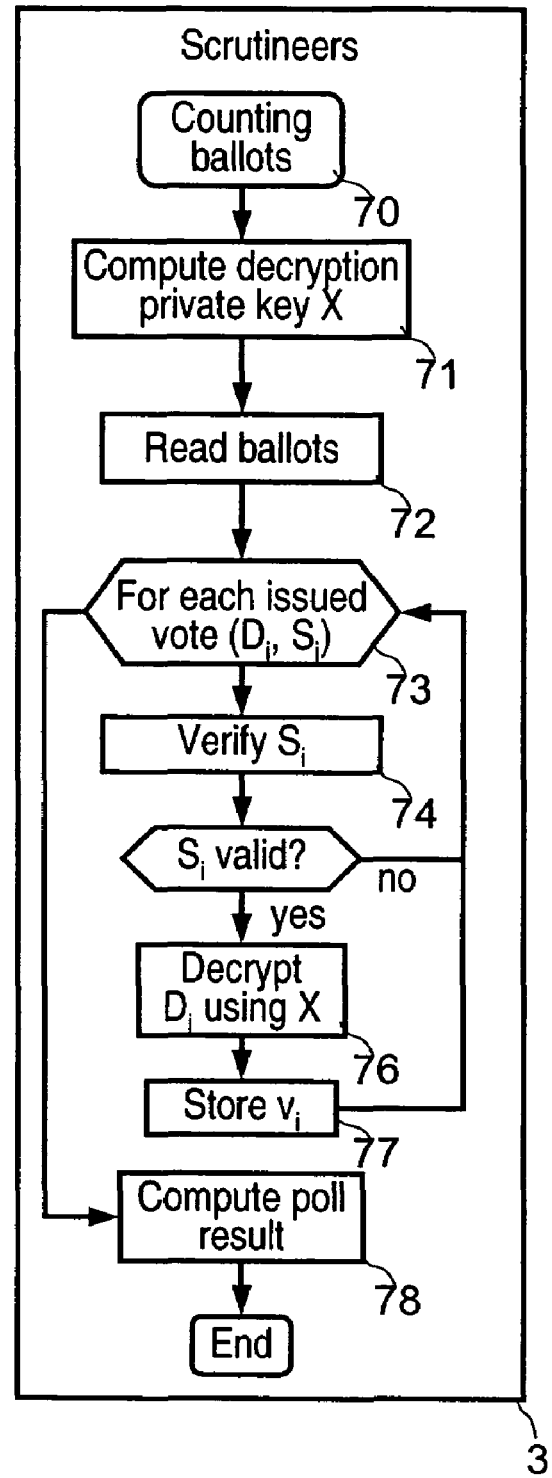

Verification of a signature of a message M takes place by executing the procedure 40 illustrated in FIG. 5. This procedure first of all comprises in step 41, the calculation of the following numbers:

$$t_1 = a_0^c T_1^{s_1 - c2^{\gamma_1}}/(a^{s_2 - c2^{\lambda_1}} b^{s_3}) \pmod{n} \tag{35}$$

$$t_2 = T_2^{s_1 - c2^{\gamma_1}}/g^{s_3} \pmod{n} \tag{36}$$

$$t_3 = T_2^c g^{s_4} \pmod{n} \tag{37}$$

$$t_4 = T_3^c g^{s_1 - c2^{\gamma_1}} h^{s_4} \pmod{n} \tag{38}$$

According to the invention, it also comprises the calculation of the following numbers:

$$t_5 = T_4^c m^{s_2 - c2^{\lambda_1}} \pmod{n} \tag{39}$$

$$c' H(m\|b\|g\|h\|a_0\|a\|T_1\|T_2\|T_3\|T_4\|t_1\|t_2\|t_3\|t_4\|t_5\|M), \tag{40}$$

The signature is authentic if the following conditions are met in step 42:

$$c' = c \tag{41}$$

$$s_1 \in \pm\{0,1\}^{\epsilon(\gamma_2+k)+1} \tag{42}$$

$$s_2 \in \pm\{0,1\}^{\epsilon(\lambda_2+k)+1} \quad (43)$$

$$s_3 \in \pm\{0,1\}^{\epsilon(\gamma_1+2l_p+k+1)+1} \quad (44)$$

$$s_4 \in \{0,1\}^{\epsilon(2l_p+k)+1} \quad (45)$$

If these conditions are not met, the signature is not valid (step 45).

In addition, by accessing all the signatures which have been produced during a given sequence, for example in the database 4, in step 43 it may easily be verified with parameter $T_4$ whether a member of the list has signed several times: all the signatures issued by a member of the list comprise a parameter $T_4$ with the same value for a given serial number.

It should further be noted that a member cannot cheat by using another value as $T_4$ is strongly linked to $T_1$. Indeed, the formula for calculating $T_1$ may also be written as follows:

$$T_1^{ei} = a_0 a^{xi} b^{\omega ei} (\text{mod } n) \quad (46)$$

If $T_4$ is already in the set of signatures issued for a given serial number, it is inferred from this that the signature was already issued by a member of the list for this serial number (step 46).

In order to include a possibility for revoking a member of the list, the method which has just been described may be changed in the following way.

The procedure for organizing 10 the list further comprises in step 14, the random selection of a number u belonging to set QT(n), and the definition of two sets $E_{add}$ and $E_{del}$ which are empty initially.

The public key PK of the reliable authority then consists of the sequence of integers (n, a, $a_0$, b, g, h, u) and of sets $E_{add}$ and $E_{del}$.

During the registration procedure 20, 20', the computer 1 of the reliable authority assigns in step 25', the $u_i$ parameter to the new member $U_i$ of the list, this parameter being such that $u_i = u$, and updates the value of the u parameter by replacing this value with $u^{ei}$.

The certificate of the new member then groups together integers $A_i$, $e_i$ and $u_i$, this certificate being stored in step 26' for future changes and transmitted to the new member.

The reliable authority also introduces the number $e_i$ assigned to the new member in the set $E_{add}$.

Upon receiving his/her certificate, the new member further verifies whether:

$$u_i^{ei} = u (\text{mod } n) \quad (47)$$

The other members $U_j$ of the list must then execute an updating procedure in order to take into account the arrival of a new member and therefore the change in the list parameter u. This procedure consists of recalculating their $u_j$ parameter as follows:

$$u_j = u_j^{ei} (\text{mod } n) \quad (48)$$

In this way, relationship (47) is always met for all the pairs ($u_j$, $e_j$) of all the members of the list.

The procedure for revoking a member $U_k$ of the list whose certificate is ($A_k$, $e_k$, $u_k$) for the reliable authority consists of changing the u parameter as follows:

$$u = u^{1/e_k} (\text{mod } n) \quad (49)$$

and of introducing parameter $e_k$ into set $E_{del}$.

In addition, each unrevoked member $U_j$ of the list should take into account this revocation (change in the parameter u) by recalculating his/her $u_j$ parameter as follows:

$$u_j = u_j^b u^a (\text{mod } n) \quad (50)$$

a and b being such that $ae_j + be_k = 1$.

In order to determine a and b, it is sufficient to apply the extended Euclid algorithm consisting of carrying out a series of Euclidian divisions.

It should be noted that the revoked member (having $e_k$) cannot determine a and b with formula (50) which becomes $e_k(a+b)=1$, and so recalculate the $u_k$ parameter.

During the signing procedure 30 by a member of the list, in step 31, numbers $W_1$, $W_2$ and $W_3$, with a binary length equal to $2l_p$, i.e. belonging to the set $\{0, 1\}^{2l_p}$ must further be selected randomly, and the following numbers must be calculated in step 32:

$$T_5 = g^{ei} h^{w1} (\text{mod } n) \quad (51)$$

$$T_6 = u_i h^{w2} (\text{mod } n) \quad (52)$$

$$T_7 = g^{w2} h^{w3} (\text{mod } n) \quad (53)$$

Numbers $r_5$, $r_6$, $r_7$ belonging to the set $\pm\{0, 1\}^{\epsilon(2l_p+k)}$, and numbers $r_8$ and $r_9$ belonging to the set $\pm\{0, 1\}^{\epsilon(\gamma_1+2l_p+k+1)}$, must also be selected randomly and then the following numbers must be calculated in step 34:

$$d_6 = g^{r1} h^{r5} (\text{mod } n) \quad (54)$$

$$d_7 = g^{r6} h^{r7} (\text{mod } n) \quad (55)$$

$$d_8 = T_6^{r1} / h^{s8} (\text{mod } n) \quad (56)$$

$$d_9 = T_7^{r1} / (g^{r8} h^{r9}) (\text{mod } n) \quad (57)$$

Number c then includes the following elements:

$$c = H(m\|b\|g\|h\|a_0\|a\|T_1\|T_2\|T_3\|T_4\|T_5\|T_6\|T_7\|d_1\|d_2\|d_3\|d_4\|d_5\|d_6\|d_7\|d_8\|d_9\|M) \quad (59)$$

In step 35, the following needs to be calculated:

$$s_5 = r_5 - cw_1 \quad (59)$$

$$s_6 = r_6 - cw_2 \quad (60)$$

$$s_7 = r_7 - cw_3 \quad (61)$$

$$s_8 = r_8 - ce_i w_2 \quad (62)$$

$$s_9 = r_9 - ce_i w_3 \quad (63)$$

The signature then consists of the set of following numbers:

$$(c, s_1, s_2, s_3, s_4, s_5, s_6, s_7, s_8, s_9, T_1, T_2, T_3, T_4, T_5, T_6, T_7). \quad (64)$$

The procedure 40 for verifying a signature then further comprises the calculation of the following numbers in step 41:

$$t_6 = T_5^c g^{s1-c2^{\gamma_1}} h^{s5} (\text{mod } n) \quad (65)$$

$$t_7 = T_7^c g^{s6} h^{s7} (\text{mod } n) \quad (66)$$

$$t_8 = u^c T_6^c g^{s1-c2^{\gamma_1}} / h^{s8} (\text{mod } n) \quad (67)$$

$$t_9 = T_7^{s1-c2^{\gamma_1}} / (g^{s8} h^{s9}) (\text{mod } n) \quad (68)$$

$$c' = H(m\|b\|g\|h\|a_0\|a\|T_1\|T_2\|T_3\|T_4\|T_5\|T_6\|T_7\|t_1\|t_2\|t_3\|t_4\|t_5\|t_6\|t_7\|t_8\|t_9\|M) \quad (69)$$

The signature is authentic if the following addition conditions are met in step 42:

$$s_5 \in \pm\{0,1\}^{\epsilon(2l_p+k)+1}, \quad (70)$$

$$s_6 \in \pm\{0, 1\}^{\epsilon(2l_p+k)+1} \quad (71)$$

$$s_7 \in \pm\{0,1\}^{\epsilon(2l_p+k)+1} \quad (72)$$

$$s_8 \in \pm\{0,1\}^{\epsilon(\gamma 1+2l_p+k+1)+1}, \text{ and} \tag{73}$$

$$s_9 \in \pm\{0,1\}^{\epsilon(\gamma 1+2l_p+k+1)+1} \tag{74}$$

It should be noted that unlike the group signature described in document [1], it is not possible for the reliable authority to find out the identity of a signatory, i.e. number $A_i$ of the signatory certificate from a list signature as described. Indeed, unlike the method described in this document, the reliable authority does not use a private key x for generating the b parameter, and therefore number $A_i$ cannot be inferred from $T_1$ and $T_2$.

In addition, the signature generated by a revoked member $U_k$ will be detected as invalid. Indeed, parameter $T_6$ involves parameter $u_k$, which was determined from the common parameter u, and parameter $t_8$ which is calculated in order to verify the signature, also involves parameter u which was changed as a result of the revocation of member k. As a result, upon verifying the signature, parameters $T_6$ and $t_8$ are inconsistent, and therefore the equality between c and c' cannot be verified by the signature of member k.

The list signature method which has just been described may be applied to an electronic voting method. The electronic voting method according to the invention comprises several phases, including the execution of the procedures of the list signature method described hereinbefore.

This method involves an intervention from the reliable authority 1 organizing the elections, who executes for this purpose a procedure 50 for organizing the poll. This procedure consists of generating the data required for the proper course of the election, a public database accessible to all in which the ballots are collected. During the organizing of the poll, scrutineers who will count the votes and determine the result of the election are also appointed.

The reliable authority first of all proceeds with generating various parameters required for setting up a list signature, by executing the procedure 10 for organizing signing of the list. The voters should be registered beforehand in an election list for example in a town hall, and in order to receive all the data required for generating a list signature, i.e. a private key $x_i$, and a certificate $(A_i, e_i, u_i)$. With these parameters, the voters may participate in all future elections. This registration procedure may be executed between a chip card 7 and a terminal 2, for example, the chip card storing the certificate of the voter at the end of the procedure.

Before an election, the organizing authority proceeds with updating the election list by executing procedure 20, 20', for the newly registered voters, and by removing (revoking) list signature rights to all persons crossed out from the election registers (for example persons who have left the district or are deprived of their civil rights). These revocations are performed by executing the revocation procedure described herein before. In step 51 of procedure 50, the organizing authority also publishes a serial number required for setting up a new list signature series, in order to prevent voters from voting (signing) twice in this election.

Moreover, the scrutineers will create 52 the required pairs of public/private keys, so that they may all cooperate in order to be able to decrypt an encrypted message with the public key. For this purpose, the cryptographic system set up is selected in order to allow a voter to encrypt a message (ballot) with at least one public key, while imposing cooperation of all the scrutineers to use the corresponding private key(s) and thus decrypt the message.

The sharing of the decryption private key among all the scrutineers may be carried out in the following way.

Let us consider g, a generator of the cyclic group G. A respective private key $x_i$ is assigned to each scrutineer i who calculates the number $y_i$ belonging to G such that:

$$y_i = g^{x_i} \tag{75}$$

The public key Y to be used by the voters is obtained by the following formula:

$$Y = \prod_i y_i \tag{76}$$

and the corresponding private key X shared by all the scrutineers i is the following:

$$X = \sum_i x_i \tag{77}$$

It is possible to obtain a similar result by proceeding with encryption by using all the respective public keys of the scrutineers. Decryption requires knowing all the corresponding private keys.

Before going to vote, each voter should update his/her list signature certificate according to the change procedure described hereinbefore, by means of the parameters published earlier. If the voter has not been struck off the election list, this change may be made.

While the polling stations are open, each voter issues a ballot by executing a procedure 60 on a terminal. In step 61, the voter selects his/her vote $v_i$ and encrypts the latter by means of the public key of the scrutineers in order to obtain en encrypted vote $D_i$. He/she then signs the encrypted vote by means of the list signature method in order to obtain a signature $S_i$. The ballot consisting of the set $(D_i, S_i)$ of the vote and signature is then anonymously published in a public database 4.

In step 62, encryption of the vote is achieved by using a probabilistic encryption algorithm (i.e. the probability that two encryptions of a same message are identical is quasi zero), such as the El Gamal or Paillier algorithm for example. If the El Gamal algorithm applies, encryption is carried out by calculating the following numbers:

$$a_j = v_j Y^r \text{ et } b_j = g^r \tag{78}$$

where r is a random element. The encrypted vote $v_j$ then consists of the pair $D_j=(a_j, b_j)$. The voter $E_j$ then calculates 63 the list signature of the encrypted vote $S_j=\text{Sig}_{list}(a_j\|b_j)$, $\text{Sig}_{list}$ being the list signature as described hereinbefore, by executing the procedure 30 with his/her chip card 7, which is transmitted to the terminal 2.

The voter $E_j$ has just generated his/her ballot $(D_j, S_j)$ which is sent 64 to the public database 4 by means of an anonymous transmission channel, i.e. forbidding a linkage from a transmitted message to the issuer of the latter. The voter for this purpose may use a public terminal or a network of mixers.

At the end of the poll, the scrutineers carry out the counting of the votes by executing procedure 70 on the terminal 3. This procedure first of all consists of generating 71 the decryption private key X from their respective private keys $x_i$ and with the help of formula (77). Then, in step 72, they access the public database 4 of the ballots in order to obtain the ballots $(D_i, S_i)$ and to decrypt them. The actual decryption of the ballots consists of verifying 74 the signature $s_i$ for each issued ballot (step 73), by executing the procedure 40 for list signature verification as described hereinbefore, and if the signature is valid and unique (step 75), of decrypting 76 the encrypted vote $D_j$ by applying the following formula:

$$v_j = a_j / b_j^x \qquad (79)$$

The thereby decrypted and verified votes $v_j$ with the result of the corresponding verification are introduced 77 into the database 4 of the ballots, in association with the ballot $(D_j, S_j)$.

The decryption private key X is also published so that all may verify the counting of the ballots.

Once all the ballots have been counted, this procedure 70 calculates the result of the election in step 78 and updates the public database of the ballots by writing this result therein and optionally the decryption private key X.

It is easy to ascertain that the properties stated hereinbefore required for setting up an electronic vote system, are checked by the method described above. Indeed, every voter can only vote once, as it is easy to find in the database two signatures issued by a same voter for a same poll (for a same serial number). In this case, the scrutineer may not take into account both votes or only count one vote if they are identical.

Alternatively, in step 64 for inserting a vote in the database 4, verification may be provided as to whether the vote issued by the voter does not already exist in the database by searching therein for the parameter $T_4$ specific to the voter. If it is thereby detected that the voter has already voted for this poll, the new vote is not inserted into the database 4.

Subsequently, it is not possible to begin counting the ballots before the end of the poll if at least one of the scrutineers observes the rule, as the presence of all the scrutineers is required for counting a ballot. Finally, the result of the election may be verified by all as the scrutineers provide all the required elements (in particular the counting private key) in the database in order to proceed with such a verification, and that the verification of a signature is accessible to all by using the public key $PK=(n, a, a_0, b, g, h, u)$ of the reliable authority. Hence, anybody may perform the counting in the same way as the scrutineers and therefore make sure that it was performed properly.

The keys of the scrutineers are of course obsolete at the end of the poll, as they are published.

The invention claimed is:

1. A list signature method comprising:
   an organizing phase including, for a reliable authority, defining parameters for implementing an anonymous electronic signature, including a private key and a corresponding public key;
   a phase of registering persons in a list of members authorized to generate an electronic signature specific to the members of the list, during which each person to be registered, calculates a private key by means of parameters provided by the reliable authority and by parameters randomly selected by the person to be registered, and the reliable authority delivers to each person to be registered, a certificate of membership of the list;
   a phase of defining a sequence including for the reliable authority, generating a serial number to be used in a signing phase;
   a signing phase during which a member of the list generates and issues a signature specific to the members of the list, this signature being built so as to contain proof that the member of the list having issued the signature, has a certificate of membership of the list, and a signature element which is common to all the signatures issued by a same member of the list with a same serial number and which contains proof that the serial number was used for generating the signature;
   a phase of verifying the issued signature, comprising steps of applying a predefined algorithm in order to show proof that the signature was issued by a person having a certificate of membership of the list, and verifying using said signature element that the serial number was used for generating the signature;
   a phase of revoking a member of the list in order to remove a member from the list, during which the reliable authority removes the member to be removed from the list and updates the parameters for implementing the anonymous electronic signature, in order to take into account the removal of the member from the list; and
   a phase of updating certificates of the members of the list in order to take into account changes in the composition of the list.

2. The method according to claim 1, wherein the organizing phase comprises the definition of a common parameter depending on the composition of the list, the phase for registering a person in the list comprising the definition of a parameter specific to the person to be registered which is calculated according to the parameter depending on the composition of the list and which is integrated into the certificate handed out to the person, the registering phase comprising a step of updating the common parameter depending on the composition of the list, the phase of revoking a member of the list comprising a step of changing the common parameter depending on the composition of the list, in order to take into account the removal of the member from the list, and the phase of updating certificates of the members of the list including a step for updating the parameter specific to each member of the list in order to take into account changes in the composition of the list.

3. The method according to claim 1 or 2, wherein a signature specific to a member of the list and having the certificate comprises parameters $T_1$, $T_2$, $T_3$, such that:

$$T_1 = A_i b^\omega \pmod{n},$$

$$T_2 = g^\omega \pmod{n},$$

$$T_3 = g^{e_i \, h\omega} \pmod{n},$$

ω being a number randomly selected during the signing phase and b, g, h and n being general parameters for implementing the group signature, such that parameters b, g and h cannot be inferred from each other by integer power raising modulo n functions, so that the number $A_i$, and therefore the identity of the member of the list having the certificate $[A_i, e_i]$ cannot be inferred from a signature issued by the member.

4. The method according to claim 1, wherein the number of the series used for generating a list signature is calculated as a function of a date of the beginning of the series.

5. The method according to claim 4, wherein the function for calculating the number of a series is of the form:
   $F(d) = (H(d))^2 \pmod{n}$
   wherein H is a collision-resistant hash function, d is the date of the beginning of the series, and n is a general parameter for implementing the group signature.

6. The method according to claim 1,
   wherein a signature issued by a member of the list contains a parameter which is calculated according to the serial number and the private key of the signatory member.

7. The method according to claim 6, wherein the parameter $T_4$ of a signature issued by a member of the list and depending on the serial number m and on the private key $x_i$ of the signatory member is obtained by the following formula:

$$T_4 = m^{x_i} \pmod{n}$$

n being a general parameter for implementing the group signature, and the signature comprises proof that the parameter T4 was calculated with the private key xi of the member of the list who issued the signature.

8. An electronic voting method comprising:

an organizing phase of a poll including, for a reliable authority, defining parameters for implementing an anonymous electronic signature for being used to sign a ballot, said parameter including a private key and a corresponding public key; and of assigning keys to scrutineers, allowing them to decrypt and verify ballots poll;

a phase of registering voters in a list of voters authorized to generate an electronic signature specific to the members of the list, during which each voter to be registered calculates a private key by means of parameters provided by the reliable authority and by parameters randomly selected by the voter to be registered, and the reliable authority delivers to each voter to be registered, a certificate of membership of the list of voter;

a phase of defining a sequence for the elections including, for the reliable authority, generating a serial number to be used in a voting phase;

a voting phase during which the voters of the list of voters sign a ballot by issuing a signature specific to the members of the list of voters, this signature being built so as to contain a proof that the member of the list of voters having issued the signature, has a certificate of membership of the list, and a signature element which is common to all the signatures issued by a same member of the list with a same serial number and which contains proof that the serial number was used for generating the signature; and a counting phase during which the scrutineers verify the ballots and calculate the result of the poll according to the contents of the decrypted and valid ballots, the verification of a ballot comprising steps of applying a predefined algorithm in order to show proof that the signature was issued by a person having a certificate of membership of the list of voters, and verifying using said signature element that the serial number was used for generating the signature, in order to detect whether a same voter has issued several ballots for the poll or not;

a phase of revoking a member of the list of voters in order to remove a member from the list, during which the reliable authority removes the member to be removed from the list of voters and updates the parameters for implementing the anonymous electronic signature, in order to take into account the removal of the member from the list; and a phase of updating certificates of the members of the list of voters in order to take into account changes in the composition of the list.

9. The voting method according to claim 8, wherein the organizing phase comprises the handing out to each scrutineer of a public key and a private key, the ballots are encrypted by means of a public key obtained by the product of the respective public keys (yi) of all the scrutineers, and the corresponding decryption private key is obtained by calculating the sum of the respective private keys of all the scrutineers.

10. The voting method according to claim 9, wherein encryption of the ballot is carried out by means of a probabilistic encryption algorithm.

11. The voting method according to claim 8, wherein the ballots issued by the votes are stored in a public database in that the result of the verification and counting of each ballot is stored in the database in association with the ballot, and in that the private key for decrypting the ballots is published.

12. A server for organizing a list signature comprising means for:

generating parameters for implementing an anonymous electronic signature, specific to members of a list, said parameters including a private key and a corresponding public key;

transmitting each person to be registered in said list parameters to be used for calculating a private key by means of parameters randomly selected by the person to be registered, and a certificate of membership of the list;

generating a serial number to be used by the members registered in said list for generating an anonymous signature specific to the members of the list, this signature being built so as to contain a proof that the member of the list having issued the signature, has a certificate of membership of the list, and a signature element which is common to all the signatures issued by a same member of the list with a same serial number and which contains proof that the serial number was used for generating the signature;

removing a member of the list to be revoked, and updating the parameters for implementing the anonymous electronic signature, in order to take into account the removal of the revoked member from the list; and updating the certificates of the members of the list each time the composition of the list is changed.

13. A server for organizing an electronic vote comprising means for:

generating during a poll organization phase parameters for implementing an anonymous electronic signature for being used to sign a ballot, said parameter including a private key and a corresponding public key;

generating keys to be assigned to scrutineers, allowing them to decrypt and verify signatures of ballots issued by voters for the poll, said signature being specific to members of a list of voters;

transmitting to each person to be registered in the list of voters parameters to be used for calculating a private key by means of parameters randomly selected by the person to be registered, and a certificate of membership of the list;

generating a serial number specific to the poll, to be used by the members registered in said list of voters for generating an anonymous signature of a ballot specific to the members of the list of voters, this signature of a ballot being built so as to contain a proof that the member of the list of voters having issued the signature, has a certificate of membership of the list of voters, and a signature element which is common to all the signatures issued by a same member of the list of voters with a same serial number and which contains proof that the serial number was used for generating the signature;

removing a member of the list of voters to be revoked, and updating the parameters for implementing the anonymous electronic signature, in order to take into account the removal of the revoked member from the list of voters; and updating the certificates of the members of the list of voters each time the composition of the list for the poll is changed.

14. A terminal for generating a list signature comprising means for:

receiving from a reliable authority parameters to be used for calculating a private key;

calculating a private key by means of the received parameters and parameters randomly selected;

receiving from the reliable authority a certificate of membership of the list;

receiving a serial number to be used for generating an anonymous signature specific to the members of the list;

generating an anonymous signature specific to the members of the list, this signature being built so as to contain a proof that the member of the list having issued the signature, has a certificate of membership of the list, and a signature element which is common to all the signatures issued by a same member of the list with a same serial number and which contains proof that the serial number was used for generating the signature;

verifying a signature issued by a member of said list by applying a predefined algorithm in order to show proof that the signature was issued by a person having a certificate of membership of the list, and by verifying using said signature element that the serial number was used for generating the signature; and receiving a new certificate of membership of the list each time the composition of the list is changed.

15. A terminal for issuing an electronic signature of a ballot during an electronic vote, comprising means for:

receiving from a reliable authority parameters to be used for calculating a private key;

calculating a private key by means of the received parameters and parameters randomly selected;

receiving from the reliable authority a certificate of membership of a list of voters;

receiving a serial number to be used for generating an anonymous signature of a ballot for said poll, said signature being specific to the members of the list of voters;

generating an anonymous signature specific to the members of the list of voters, this signature being built so as to contain a proof that the member of the list of voters having issued the signature, has a certificate of membership of the list of voters, and a signature element which is common to all the signatures issued by a same member of the list of voters with a same serial number and which contains proof that the serial number was used for generating the signature;

verifying a signature issued by a member of said list of voters by applying a predefined algorithm in order to show proof that the signature was issued by a person having a certificate of membership of the list of voters, and by verifying using said signature element that the serial number was used for generating the signature; and receiving a new certificate of membership of the list of voters each time the composition of the list of voters is changed.

\* \* \* \* \*